(12) United States Patent
Burcham et al.

(10) Patent No.: US 10,313,219 B1
(45) Date of Patent: Jun. 4, 2019

(54) PREDICTIVE INTELLIGENT PROCESSOR BALANCING IN STREAMING MOBILE COMMUNICATION DEVICE DATA PROCESSING

(71) Applicant: Sprint Communications Company L.P., Overland Park, KS (US)

(72) Inventors: Robert H. Burcham, Overland Park, KS (US); Geoffrey A. Holmes, Overland Park, KS (US); Rakesh Anavalamudi Surendra, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 144 days.

(21) Appl. No.: 15/346,728

(22) Filed: Nov. 8, 2016

(51) Int. Cl.
| | |
|---|---|
| H04L 12/26 | (2006.01) |
| H04L 12/46 | (2006.01) |
| H04W 74/04 | (2009.01) |
| H04W 88/02 | (2009.01) |
| H04W 88/08 | (2009.01) |
| H04W 84/12 | (2009.01) |
| H04W 84/04 | (2009.01) |

(52) U.S. Cl.
CPC .......... *H04L 43/14* (2013.01); *H04L 12/4641* (2013.01); *H04L 43/04* (2013.01); *H04L 43/16* (2013.01); *H04W 74/04* (2013.01); *H04W 84/042* (2013.01); *H04W 84/12* (2013.01); *H04W 88/02* (2013.01); *H04W 88/08* (2013.01)

(58) Field of Classification Search
CPC ..... H04L 43/14; H04L 12/4641; H04L 43/04; H04L 43/16; H04L 12/26; H04L 12/24; H04W 74/04; H04W 88/02; H04W 88/08; H04W 84/12; H04W 84/04
See application file for complete search history.

(56) References Cited

U.S. PATENT DOCUMENTS

| | | | | |
|---|---|---|---|---|
| 8,205,202 | B1* | 6/2012 | Leonard ................ | G06F 9/5055 718/100 |
| 2013/0007753 | A1* | 1/2013 | Jain ........................... | G06F 9/46 718/103 |
| 2013/0218941 | A1* | 8/2013 | Bushin .................. | H04L 67/325 709/201 |
| 2016/0182380 | A1* | 6/2016 | Mehra ................... | H04L 47/125 709/226 |

* cited by examiner

*Primary Examiner* — Walter J DiVito
*Assistant Examiner* — Anthony Luo

(57) ABSTRACT

A method of processing a stream of mobile communication device data events. The method comprises determining by a script executing on a computer system a number of events on a first number of data event queues, where the events are mobile communication device data events waiting to be processed and the first number of data event queues are associated with a first topic, comparing the number of events on the first number of queues to a predefined queue depth threshold associated, based on the comparison, creating additional queues associated with the first topic to establish a second number of queues associated with the first topic, rebalancing the queues associated with the first topic by moving some of the events stored on the queues to the additional queues, and creating additional event processing threads based on creating the additional queues.

19 Claims, 5 Drawing Sheets

PREDICTIVE INTELLIGENT PROCESSOR BALANCING IN STREAMING MOBILE COMMUNICATION DEVICE DATA PROCESSING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices generate large numbers of events or data points that may be centrally collected, stored, and analyzed. The mobile data may be used to measure the performance of a wireless communication network and to adapt radio access network (RAN) parameters to improve the overall performance of a service provider's wireless network. The mobile data may be used to determine behavioral trends of mobile phone users and use that analysis to better target sending of unsolicited content to mobile phone users.

SUMMARY

In an embodiment, a method of processing a stream of mobile communication device data events by data event queues and event processing threads is disclosed. The method comprises determining by a script executing on a computer system a number of events on a first number of data event queues, where the events are mobile communication device data events waiting to be processed and the first number of data event queues are associated with a first topic and comparing the number of events on the first number of data event queues by the script to a predefined queue depth threshold associated with the first topic. The method further comprises, based on the comparison, creating additional data event queues associated with the first topic by the script to establish a second number of data event queues associated with the first topic where the second number is greater than the first number and creating additional event processing threads to execute a third number of event processing threads, where the third number is determined by the script based on the second number of data event queues and based on queue-processing balancing rules reflecting application layer conditions.

In another embodiment, a computer system that processes a stream of mobile communication device data events by data event queues and event processor images is disclosed. The computer system comprises a processor, a non-transitory memory, a messaging middleware stored in the non-transitory memory that, when executed by the processor provides a plurality of event queues for each of a plurality of different event topics, and a plurality of event processor images stored in the non-transitory memory, each event processor image associated with one of the different event topics, that when executed by the processor removes events on an event queue associated with the event topic associated with the event processor and processes the events. The computer system further comprises a plurality of scripts stored in the non-transitory memory each script, when executed by the processor, monitors the event queues associated with the event topic the script is associated to, expands the number of event queues associated with the event topic in response to determining that a queue depth of the event queues associated with the event topic exceeds a first predefined threshold, increases the number of instantiated event processor images associated with the event topic in response to expanding the number of event queues associated with the event topic and based on queue-processing balancing rules reflecting application layer conditions, contracts the number of event queues associated with the event topic in response to determining that the queue depth of the event queues associated with the event topic is less than a second predefined threshold, where the second predefined threshold is less than the first predefined threshold, and decreases the number of instantiated event processor images associated with the event topic in response to contracting the number of event queues associated with the event topic.

In yet another embodiment, a method of processing a stream of mobile communication device data events by event queues and event processing threads is disclosed. The method comprises analyzing events generated by mobile communication devices by an application executing on a computer system and determining a model associated with a first topic based on analyzing the events by the application, where the model predicts a volume of mobile communication device events streamed to a data event queue based on earlier mobile communication device events streamed to the data event queue. The method further comprises determining by a script executing on a computer system a number of events on a first number of data event queues, where the events are mobile communication device data events waiting to be processed and the first number of data event queues are associated with the first topic, comparing the number of events on the first number of data event queues by the script to a queue depth threshold associated with the first topic determined using the model associated with the first topic, based on the comparison, creating additional data event queues associated with the first topic by the script to establish a second number of data event queues associated with the first topic where the second number is greater than the first number, and creating additional event processing threads by the script based on creating the additional data event queues and based on queue-processing balancing rules reflecting application layer semantics.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
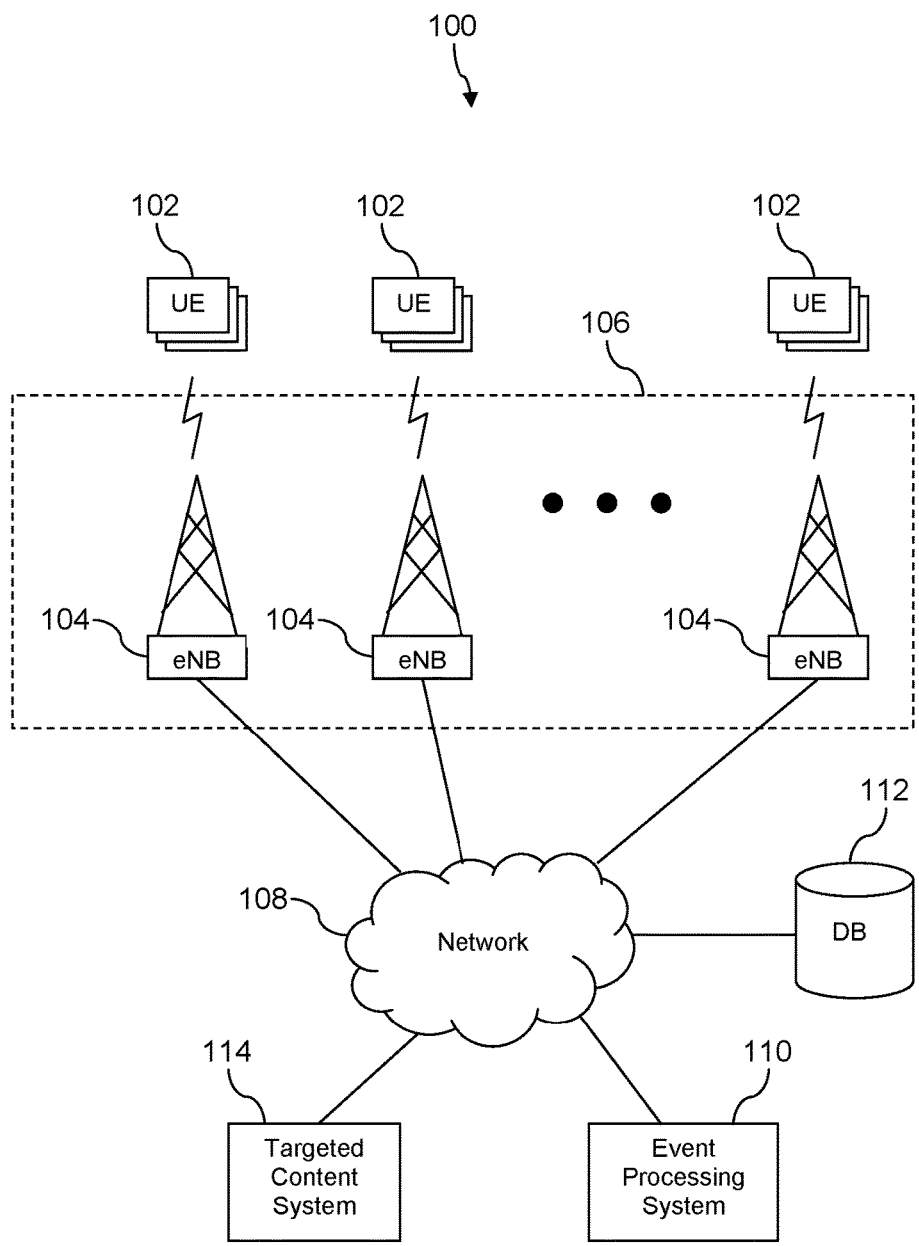
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A computer system for predicting event processing volumes in a streamed event handling system is described. The system comprises a plurality of event producers, a plurality of event queues, and a plurality of event consumers. The events may be, for example, data captured during the operation of mobile communication devices. In one implementation, a very high volume of events may flow into the system. The event producers may associate different events with different event topics. Each event topic may be associated with a plurality of event queues. Event consumers may remove events from event queues associated with a single topic and process the events. For example, an event consumer may enrich the event data with related information and store the enriched event data in a searchable database. The event consumers may process the events by anonymizing an identity contained in the raw event data, to protect telecommunication subscriber identities. The event consumers may process the events in other ways. Event producers may comprise executing logic or images, for example processing threads. Likewise, event consumers may comprise executing logic or images, for example processing threads. Establishing an appropriate number of event queues and event consumers and configuring the event queues for satisfactory performance is a challenging technical task, particularly in a system that handles a very large volume of events, such as a system that handles events generated by tens of millions of mobile phones. It is noted that events generated by mobile phones can vary significantly in volume over relatively short periods of time, for example over one or two hours, based on user behaviors.

The present disclosure teaches intelligent automated dynamic instantiation of event queues and event consumer processing images or threads based on analysis of current queue depths. As queue depths exceed a threshold, the number of event queues on an event topic may be automatically increased. In coordination with increasing the number of event queues, the number of event consumers may be automatically increased in a desirable relation to the increase of event queues. The increase in the number of event consumers may be based on event queue-to-event consumer processing thread balancing rules that reflect knowledge of application layer behavior or application layer semantics. Said in another way, the desirable relation of the number of event queues to event consumer processing threads may be determined according to queue-processing balancing rules that are determined based on an understanding of telecommunications system application layer behaviors that feed the events into the system.

The increase in the number of event consumers associated with an increase in event queues may not be linearly or proportionally related to the increase in the number of event queues. Additionally, the increase in the number of event consumers may lag or lead in time the increase in the number of event queues. For example, a particular pattern of event flow (e.g., a particular pattern of queue depth values over time) may be associated with a future "event bloom"—a sudden but predictable increase in event inflow—and the system may accordingly build up the number of event consumers in advance of the anticipated event bloom. In this scenario, the increase of the number of event consumer processing threads leads the actual increase of event in-flow and leads the actual increase in the number of event queues (on the assumption that the event bloom will cause event queue depth to grow beyond a threshold, and the system would then increase the number of event queues but in this case lagging the increase in event inflow).

Further, in coordination with increasing the number of event queues, the events on the previously existing event queues associated with the topic may be rebalanced over all the event queues associated with the topic. Said in other words, some of the events stored on the previously existing event queues may be transferred to the newly instantiated event queues, whereby to better balance the load of events across all of the event queues associated with the topic. The number of event queues may also be decreased in number as queue depths on the event queues of a topic fall below a minimum queue depth threshold. In an embodiment, a minimum number of event queues may be configured for a topic such that even if queue depths fall below the minimum queue depth threshold the number of event queues would not be reduced below the minimum number of event queues.

In an embodiment, the queue depth thresholds are dynamically defined based on an event stream prediction model. The event stream prediction model is used in conjunction with current and recent event in-flow metrics to predict the event volume rate that will be experienced over a future period of time, for example over the next minute, the next five minutes, the next ten minutes, or some other period of time. The event stream prediction model may be generated automatically by a model generation application based on analyzing history of event handling. The model generation application may identify event flow volume patterns based on time of day and/or day of week. The model generation application may identify event flow volume patterns based on signatures of event correlations. For example, an increased and steady flow of a first event type over at least two hours may be associated with a strongly increased flow of a second event type about four hours after the initial increase in flow of the first event type. This "event flow signature" may be identified by the model generation application based on analyzing history of event flows and used to generate a component or rule of the model. The component may be used to proactively increase the number of event queues associated with the topic of the second event type about three hours and forty-five minutes after an initial increase in flow of the first event type. This may be accomplished by changing event queue depth thresholds and/or by reconfiguring a script that manages the numbers of event queues and the numbers of event consumers.

The event in-flow rate may be predicted for several succeeding periods of time based on the event stream prediction model. Based on the event in-flow rate predictions, the event queue depth thresholds may be adapted. Additionally, based on the event in-flow rate predictions and/or based on analysis of the current queue depth, an event aging threshold may be adapted either higher or lower. When a date-time stamp associated with an event indicates that the event has aged beyond the event aging threshold, the event may be removed from the event queue and discarded.

The event stream handling system described herein may handle hundreds of thousands of events per second and this rate of streaming may significantly increase or decrease in relatively short periods of time. To allocate resources to this processing that are sufficient for maximum in-flow conditions but not inefficiently excessive for minimum in-flow conditions involves dynamic scaling of the resources. A proper relationship between event queues and event consumers is desirably maintained, but the proper relationship may be different under different conditions. For example, different types of events may be associated with different relationships or ratios of event queues to event consumers. By taking into consideration application level semantics (the content of the events), the event queues and event consumers may be better balanced. The application level semantics can also be exploited to anticipate when sudden changes in event production may happen. The system taught herein mitigates complicated problems that are endemic to the event stream handling computer system.

Turning now to FIG. 1, a system 100 is described. In an embodiment, system 100 comprises a plurality of user equipments (UEs) 102, a plurality of cell sites 104, a network 108, an event processing system 110, and a data store 112. The UEs 102 may be mobile phones, smart phones, personal digital assistants (PDAs), media players, wearable computers, headset computers, laptop computers, notebook computers, or tablet computers. While FIG. 1 illustrates three UEs 102, it is understood that the system 100 may comprise any number of UEs 102. In an embodiment, the system 100 may comprise more than 40 million UEs 102. A radio access network (RAN) 106 may comprise the cell sites 104. While FIG. 1 illustrates three cell sites 104, it is understood that the system 100 may comprise any number of cell sites 104. In an embodiment, the system 100 may comprise more than 40 thousand cell sites. The network 108 may comprise one or more public networks, one or more private networks, or a combination thereof. In an embodiment, the system 100 may further comprise a targeted content system 114 that analyzes the data store to predict interest of wireless communication service subscribers to specific kinds of content to target the content to individuals who are deemed most likely to respond positively to the content. The targeted content system 114 may comprise a computer system.

The UEs 102 may establish radio communication links with the cell sites 104 using one or more of a long term evolution (LTE), a code division multiple access (CDMA), a global system for mobile communications (GSM), or a worldwide interoperability for microwave access (WiMAX) wireless communication protocol. The cell sites 104 may link the UEs 102 communicatively to the network 108. As the UEs 102 operate they generate a wide variety of events that are collected by the cell sites 104 and sent to the event processing system 110 and/or to the data store 112. The events can be reports of dropped calls, call initiations, call completions, calls blocked, duration of on-going calls. The events can be reports of signal strength and identity of proximate cell sites 104. The events can be reports of mobile application behavior, for example reports of data sessions initiated, computer hosts contacted by the UE 102, volumes of data transmitted and/or received by the UE 102. The events can be reports of on-line electronic transactions completed. The events can be reports of mobile advertisements presented on the UEs 102 and reports of presented mobile advertisements that are clicked on by a user of the UEs 102. These are just a few of the examples of different events that may be generated by the UEs 102 and/or by the cell sites 104 on behalf of the UEs 102.

Figure 2:
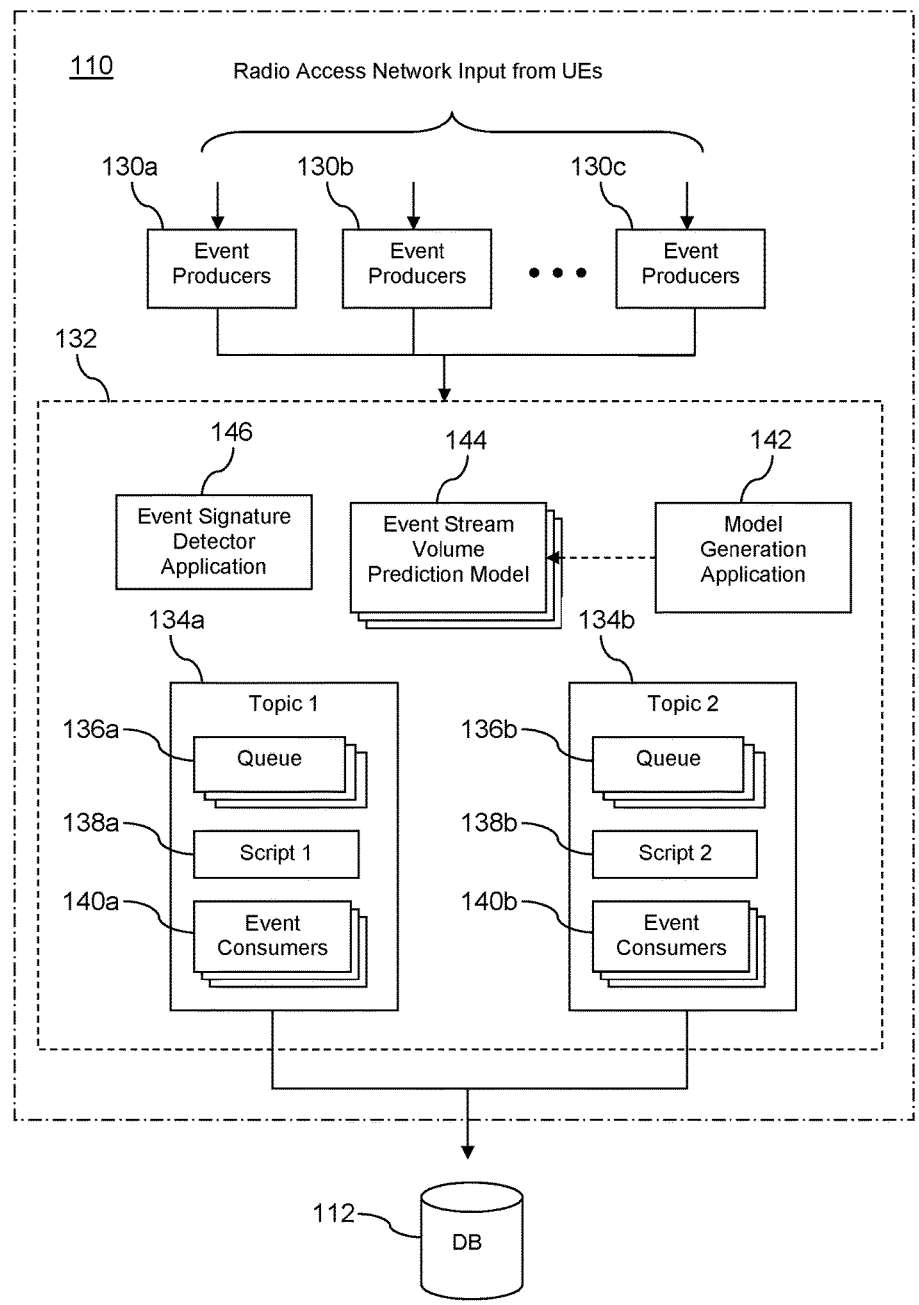
FIG. 2 is an illustration of an event processing computer system according to an embodiment of the disclosure.

Turning now to FIG. 2, further details of the event processing system 110 are described. The event processing system 110 may be implemented as one or more computers, for example by a plurality of server computers. The event processing system 110 comprises a plurality of event producers 130, for example a first event producer 130a, a second event producer 130b, and a third event producer 130c. It is understood that the event processing system 110 may comprise any number of event producers 130. The event producers 130 are receiving events related to the UEs 102, either received directly from the UEs 102 (e.g., from a UE 102 to the corresponding cell site 104, from the cell site 104 to the network 108, and from the network 108 to the event producer 130) or indirectly via the data store 112. For example, the UEs 102 may write events to the data store 112 in real-time, and the event producers 130 may read these events from the data store 112 for processing as they are able. The event producers 130 may simply process the events at a superficial level to identity the general nature of the events whereby to route them to the appropriate event topic. Alternatively, the event producers 130 may do some processing of the nature of combining events or summarizing a plurality of related events to generate a new derivative event that is placed into a topic for processing.

The event processing system 110 further comprises a plurality of topics 134, for example a first topic 134a and a second topic 134b. It is understood that the event processing system 110 may comprise any number of topics 134. Each topic 134 comprises a plurality of event queues 136, a topic adaptation script 138, and a plurality of event consumers 140. The event queues 136 may be provided as a messaging middleware application. Alternatively, the event queues 136 may be provided by an application or process that is controlled by the scripts 138. The event queues 136 may be referred to in some contexts as data event queues, and the event consumers may be referred to as event processing threads and/or as event processor images. The event producers 130 place events for processing by event consumers 140 on the event queues 136, placing events selectively on the event queues 136 of the appropriate topic 134. The event consumers 140 take events off the event queues 136 and process them as desired. FIG. 2 illustrates a first topic 134a comprising a first plurality of event queues 136a, a first script 138a, and a first plurality of event consumers 140a; and a second topic 134b comprising a second plurality of event queues 136b, a second script 138b, and a second plurality of event consumers 140b.

The script 138 is able to adapt a number of aspects of the topic 134. The script 138 can increase and decrease the number of event queues 136 associated with the topic 134. Increasing the number of event queues 136 may comprise rebalancing the event queues 136 so that some of the events stored on the previously existing event queues 136 are redistributed to the newly instantiated event queues 136. Alternatively, events may not be moved between event queues 136 and instead the event queues 136 may naturally rebalance over the passage of time. Decreasing the number of event queues 136 may comprise rebalancing the event queues 136 so that events stored on event queues 136 to be destroyed are first copied to others of the event queues 136 that are to be retained. Alternatively, the script 138 may mark one of the event queues 136 as unavailable to receive new events and may delete the subject event queue 136 only after the event consumers 140 have removed all of the events from the event queue 136. The script 138 can also increase and decrease the number of event consumers 140 associated with the topic 134.

The script 138 can adapt the ratio of event queues 136 to event consumers 140 based on a depth of the event queues 136, for example an average value of the number of events pending processing on the event queues 136 over some sliding window of time, for example over the most recent ten seconds, the most recent minute, the most recent five minutes, or some other period of time. The script 138 can also adapt the ratio of event queues 136 to event consumers 140 based on analysis of a history of previous processing of events by the event processing system 110. Said in other words, the script 138 can adapt its thresholds and ratios based on analysis of history of past event handling. The script 138 may adapt the number of event consumers 140 based on queue-processing balancing rules incorporated into the script 138, where the balancing rules reflect application layer conditions, application layer semantics, or understanding of application layer behavior. As mentioned above, telecommunications system application layer behaviors drive the generation of events, and hence building understanding of those application layer behaviors into the balancing rules and scripts, at least in part, constitutes the intelligence of the system of event processing disclosed herein.

In an embodiment, the event processing system 110 further comprises a model generation application 142 and a plurality of event stream volume prediction models 144. A different event stream volume prediction model 144 may be associated with each different topic 134. The event stream volume prediction model 144 may be generated by the model generation application 142 based on analysis of a history of events and event processing. The event stream volume prediction models 144 may be used by the scripts 138 to adapt and set thresholds for event queues, for example an event queue number increase threshold (i.e., if the number of events on a queue exceeds an associated event queue number increase threshold, the script 138 dynamically instantiates additional event queues 136) or to set an event queue number decrease threshold (i.e., if the number of events on a queue is less than an associated event queue number decrease threshold, the script 138 dynamically deletes some of the event queues 136). The script 138 may also adapt a minimum number of event queues based on the event stream volume prediction model 144. In this way the script 138 may be described as adapting the event queues 136 and the event consumers 140 based on analysis of history of events, for example analysis performed by the model generation application 142 and encapsulated in the event stream volume prediction models 144 that are used by the scripts 138.

The model generation application 142 can also identify event volume signatures such that an observed event volume of one or more different event types can predict, to a reasonable degree of probability, a future event volume of a different event type. These signatures may be encapsulated in the event stream volume prediction models 144. The scripts 138, when they observe the presence of an event signature in the current in flowing events, may adapt the event queues 136 and the event consumers 140 accordingly. In an embodiment, the event processing system 110 further comprises an event signature detector application 146. The event signature detector application 146 may monitor the totality of event flow into the event processing system 110 to detect when event signatures are present. The event signature detector application 146 can inform the appropriate script 138 when an event signature affecting the script 138 has been detected. The script 138 may change thresholds and or may change internal definitions of desired ratios of numbers of event queues 136 to numbers of event consumers 140.

With reference now to both FIG. 1 and FIG. 2, the targeted content system 114 may use the results produced by the event consumers 140 that may have been stored in the data store 112. The targeted content system 114 may use the results from the event consumers 140 in a variety of ways to develop profiles and/or models of users or subscribers associated with the UEs 102. Alternatively, other systems (not shown) may process the results produced by the event consumers 140 to create and elaborate profiles and/or models of users associated with the UEs 102, and the targeting content system 114 may then use the profiles and/or models developed by the other systems. The targeted content system 114 may use the profiles and models of users to select from a large number of users a smaller number of who are deemed, based on the profiles and/or models of users, to have an above average probability of being interested in specific content such as a specific advertisement, a specific political announcement, a specific public service announcement. The targeted content system 114 may use the profiles and models of users to select, given a particular user whose UE 102 is currently offering an opportunity of presenting content on the UE 102, to select from a pool of different kinds of content a content that is best aligned with the profile and/or model of that specific user. The targeted content system 114 may then send targeted content to the UE 102 or UEs 102 so identified.

Figure 3:
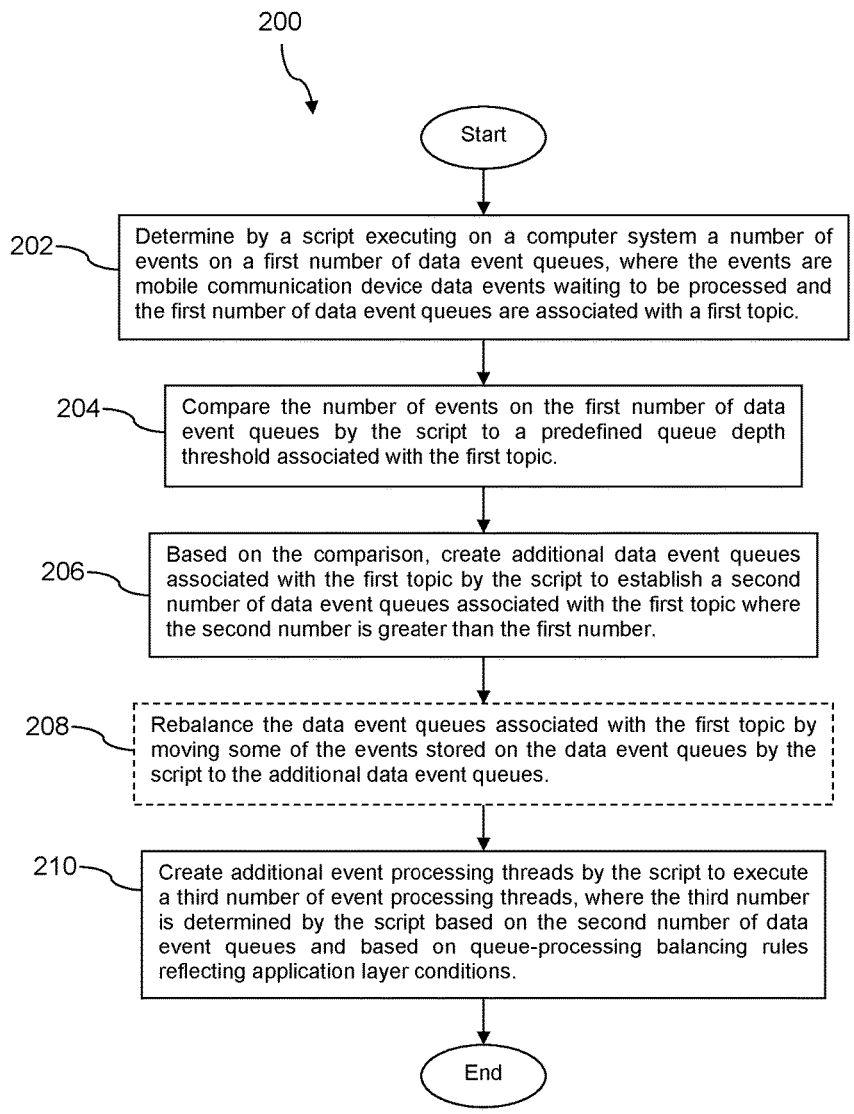
FIG. 3 is a flow chart of a method according to an embodiment of the disclosure.

Turning now to FIG. 3, a flow chart 200 is described. At block 202, a script executing on a computer system determines a number of events on a first number of data event queues, where the events are mobile communication device data events waiting to be processed and the first number of data event queues are associated with a first topic. The processing of block 202 may be said, in other words, to be determining a queue depth or an average queue depth of the data event queues. The script of block 202 may be the script 138 described above, and the data event queues may be the event queues 136 described above with reference to FIG. 2. At block 204, the script compares the number of events on the first number of data event queues to a predefined queue depth threshold associated with the first topic. Different topics 134 may be associated with different predefined queue depth threshold values. At block 206, based on the comparison, the script creates additional data event queues associated with the first topic to establish a second number of data event queues associated with the first topic where the second number is greater than the first number.

At block 208, the script optionally rebalances the data event queues associated with the first topic by moving some of the events stored on the data event queues to the additional data event queues. For example the script may rebalance the data event queues so that the additional data event queues have about the same number of events as the previously existing event queues. Alternatively, the script may not rebalance the data event queues and allow the data event queues to become balanced over time, without direct intervention by the script. At block 210, the script creates additional event processing threads to execute a third number of event processing threads, where the third number is determined by the script based on the second number of data event queues and based on queue-processing balancing rules reflecting application layer conditions.

The event processing threads may be the same as the event consumers 140 described above with reference to FIG. 2. In an embodiment, the method 200 further comprises the event consumers 140 processing events generated by the UEs 102, and the targeted content system 114 generating and transmitting targeted content to at least some of the UEs 102 based on the processed events. In an embodiment, the method 200 further comprises decreasing the number of data event queues when the number of events stored on the data event queues drops below a second threshold. The method 200 may further comprise decreasing the number of event processing threads in response to decreasing the number of data event queues.

Figure 4:
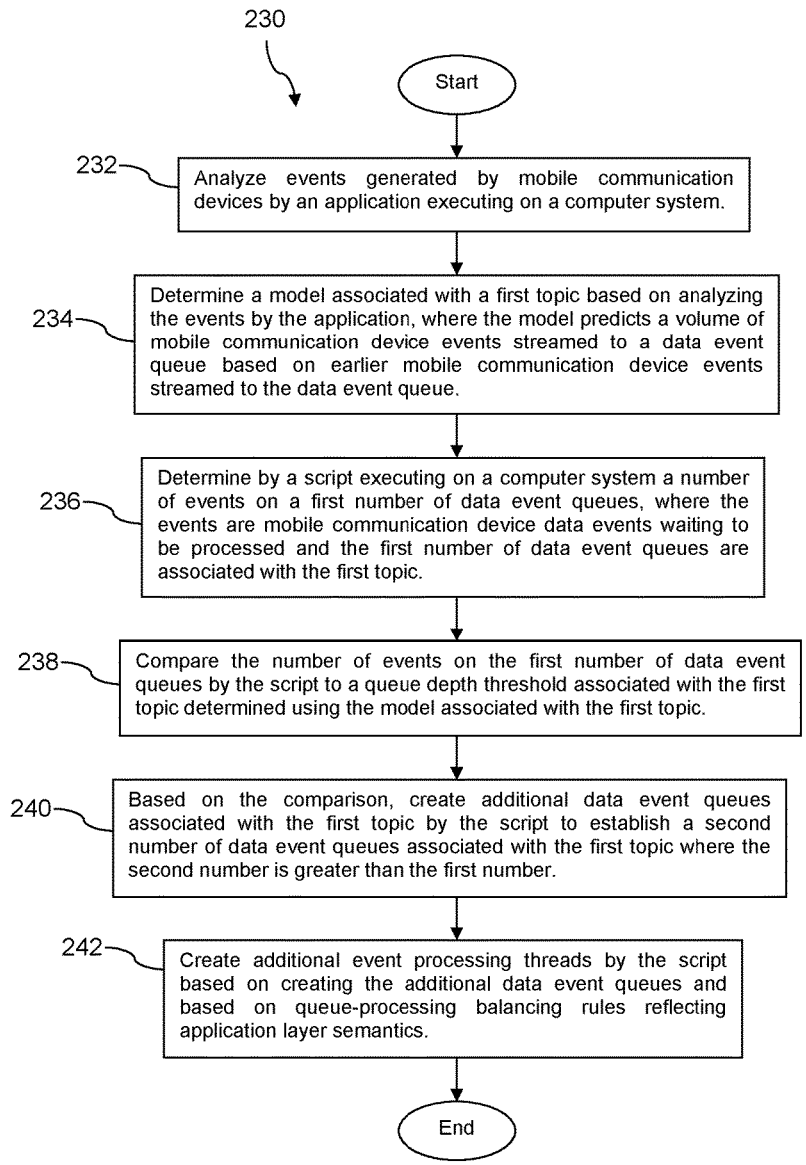
FIG. 4 is a flow chart of another method according to an embodiment of the disclosure.

Turning now to FIG. 4, a method 230 is described. At block 232, an application executing on a computer system analyzes events generated by mobile communication devices. At block 234, the application determines a model associated with a first topic based on analyzing the events by the application, where the model predicts a volume of mobile communication device events streamed to a data event queue based on earlier mobile communication device events streamed to the data event queue. At block 236, a script executing on a computer system determines a number of events on a first number of data event queues, where the events are mobile communication device data events waiting to be processed and the first number of data event queues are associated with the first topic. It is noted that the application that performs the processing of blocks 232 and 234 may execute on a different computer system from the computer system that the script executes on.

At block 238, the script compares the number of events on the first number of data event queues to a queue depth threshold associated with the first topic determined using the model associated with the first topic. At block 240, based on the comparison, the script creates additional data event queues associated with the first topic to establish a second number of data event queues associated with the first topic where the second number is greater than the first number. At block 242, the script creates additional event processing threads based on creating the additional data event queues and based on queue-processing balancing rules reflecting application layer semantics. In an embodiment, the method 230 further comprises the event consumers 140 processing events generated by the UEs 102, and the targeted content system 114 generating and transmitting targeted content to at least some of the UEs 102 based on the processed events.

Figure 5:
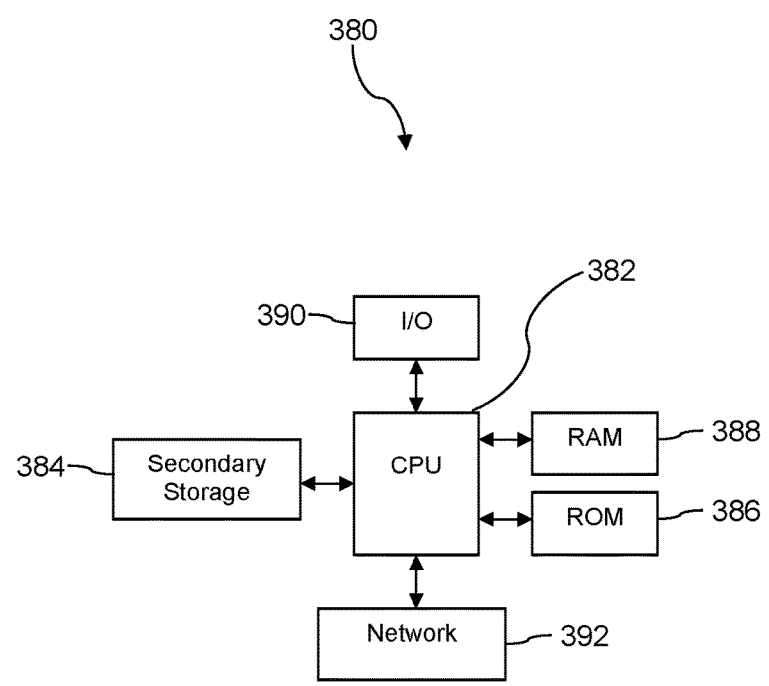
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of processing a stream of mobile communication device data events by data event queues and event processing threads, comprising:
    determining by an application executing on a computer system a model associated with a first topic based on analyzing mobile communication device events that comprise data captured during operation of mobile communication devices, where the model predicts a volume of mobile communication device events streamed to a data event queue based on earlier mobile communication device events streamed to the data event queue;
    determining by a script executing on a computer system a number of mobile communication device events on a first number of data event queues, where the mobile communication device events are waiting to be processed, and wherein the first number of data event queues are associated with the first topic;
    comparing the number of mobile communication device events on the first number of data event queues by the script to a predefined queue depth threshold associated with the first topic determined using the model associated with the first topic;
    based on the comparison, creating additional data event queues associated with the first topic by the script to establish a second number of data event queues associated with the first topic where the second number is greater than the first number; and
    creating additional event processing threads by the script to execute a third number of event processing threads, where the third number of event processing threads is determined by the script based on creating the additional data event queues and based on queue-processing balancing rules reflecting application layer conditions.

2. The method of claim 1, further determining by the script that the number of mobile communication device events on the second number of data event queues is below a second predetermined threshold and based on the determination decreasing the number of the second number of data event queues.

3. The method of claim 2, further comprising reducing the number of event processing threads by the script based on decreasing the number of the second number of data event queues.

4. The method of claim 1, further comprising rebalancing the data event queues associated with the first topic by moving some of the mobile communication device events stored on the data event queues by the script to the additional data event queues.

5. The method of claim 1, wherein the script creates additional data event queues associated with the first topic further based on an event stream volume prediction model.

6. The method of claim 1, further comprising determining that a data event volume flow matches a predefined event flow signature, wherein the script creates additional data event queues associated with the first topic based on determining that the data event volume flow matches the predefined event flow signature.

7. The method of claim 1, wherein the mobile communication device events comprise information about at least one of dropped calls, call initiations, call completions, call blocked, duration of on-going calls, radio signal strength, identity of proximate cell site, or mobile application behavior.

8. The method of claim 7, wherein the mobile application behavior comprises at least one of data sessions initiated, computer hosts contacted, volumes of data transmitted, or volumes of data received.

9. A computer system that processes a stream of mobile communication device data events by data event queues and event processor images, comprising:
    a processor;
    a non-transitory memory comprising a plurality of event stream volume prediction models, one prediction model associated with each different event topic and each script, wherein each event stream volume prediction model is determined based on analyzing mobile communication device events that comprise data captured during operation of mobile communication devices, and wherein each event stream volume prediction model predicts a volume of mobile communication device events streamed to a data event queue based on earlier mobile communication device events streamed to the data event queue;
    a messaging middleware stored in the non-transitory memory that, when executed by the processor provides a plurality of event queues for each of a plurality of different event topics;
    a plurality of event processor images stored in the non-transitory memory, each event processor image associated with one of the different event topics, that when executed by the processor removes events on an event queue associated with the event topic associated with the event processor and processes the events; and
    a plurality of scripts stored in the non-transitory memory, each script, when executed by the processor,
        monitors the event queues associated with the event topic the script is associated to,
        expands the number of event queues associated with the event topic in response to determining that a queue depth of the event queues associated with the event topic exceeds a first predefined threshold determined using a corresponding model of the plurality of event stream volume prediction models associated with the event topic,
        increases the number of instantiated event processor images associated with the event topic in response to expanding the number of event queues associated with the event topic and based on queue-processing balancing rules reflecting application layer conditions,
        contracts the number of event queues associated with the event topic in response to determining that the queue depth of the event queues associated with the event topic is less than a second predefined threshold determined using the corresponding model associated with the event topic, where the second predefined threshold is less than the first predefined threshold, and decreases the number of instantiated event processor images associated with the event topic in response to contracting the number of event queues associated with the event topic.

10. The computer system of claim 9, wherein each script further determines that events stored on the event queues exceed a predefined event aging threshold and removes events whose date-time stamp is too old.

11. The computer system of claim 9, wherein the mobile communication devices are one or more of mobile phones, smart phones, personal digital assistants (PDAs), media players, wearable computers, headset computers, laptop computers, notebook computers, or tablet computers, and wherein the events are reports of one or more of dropped calls, call initiations, call completions, call blocked, duration of on-going calls, radio signal strength, identity of proximate cell site, mobile application behavior.

12. The computer system of claim 9, wherein the event stream volume prediction models are based on analysis of a history of events received by the computer system.

13. A method of processing a stream of mobile communication device data events by event queues and event processing threads, comprising:

analyzing mobile communication device events generated by mobile communication devices that comprise data captured during operation of the mobile communication devices by an application executing on a computer system;

determining a model associated with a first topic based on analyzing the mobile communication device events by the application, where the model predicts a volume of mobile communication device events streamed to a data event queue based on earlier mobile communication device events streamed to the data event queue;

determining by a script executing on a computer system a number of mobile communication device events on a first number of data event queues, where the mobile communication device events are waiting to be processed and the first number of data event queues are associated with the first topic;

comparing the number of mobile communication device events on the first number of data event queues by the script to a queue depth threshold associated with the first topic determined using the model associated with the first topic;

based on the comparison, creating additional data event queues associated with the first topic by the script to establish a second number of data event queues associated with the first topic where the second number is greater than the first number; and creating additional event processing threads by the script based on creating the additional data event queues and based on queue-processing balancing rules reflecting application layer semantics.

14. The method of claim 13, further comprising rebalancing the data event queues associated with the first topic by moving some of the mobile communication device events stored on the data event queues by the script to the additional data event queues.

15. The method of claim 13, wherein the mobile communication device events are reports of one or more of dropped calls, call initiations, call completions, call blocked, duration of on-going calls, radio signal strength, identity of proximate cell site, mobile application behavior.

16. The method of claim 13, where mobile communication devices are one or more of mobile phones, smart phones, personal digital assistants (PDAs), media players, wearable computers, headset computers, laptop computers, notebook computers, or tablet computers.

17. The method of claim 16, wherein the mobile communication devices communicate with a radio access network (RAN) according to one or more of a long term evolution (LTE), a code division multiple access (CDMA), a global system for mobile communications (GSM), or a worldwide interoperability for microwave access (WiMAX) wireless communication protocol.

18. The method of claim 13, wherein the script maintains a constant ratio between the number of data event queues and the number of event processing threads associated with the same topic.

19. The method of claim 13, further comprising:

determining a second model associated with a second topic based on analyzing the mobile communication device events by the application, where the second model predicts a volume of mobile communication device events streamed to a second data event queue based on earlier mobile communication device events streamed to the second data event queue;

determining by a second script executing on the computer system a number of mobile communication device events on a third number of data event queues, where the mobile communication device events are waiting to be processed and the third number of data event queues are associated with the second topic;

comparing the number of mobile communication device events on the third number of data event queues by the second script to a queue depth threshold associated with the second topic determined using the second model associated with the second topic;

based on the comparison, deleting data event queues associated with the second topic by the second script to establish a fourth number of data event queues associated with the second topic where the fourth number is less than the third number; and deleting some event processing threads by the second script based on deleting some of the data event queues.

* * * * *